Figure 1:
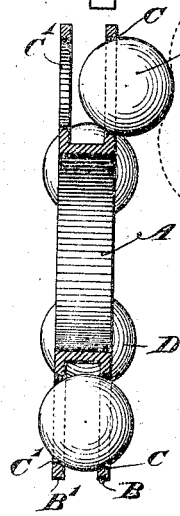

J. C. DOWELL.
BALL BEARING.
APPLICATION FILED FEB. 15, 1909.

924,440.

Patented June 8, 1909.

WITNESSES
Harry King
Joseph C. Stack.

INVENTOR
Julius C. Dowell

UNITED STATES PATENT OFFICE.

JULIAN C. DOWELL, OF WASHINGTON, DISTRICT OF COLUMBIA.

BALL-BEARING.

No. 924,440.
Specification of Letters Patent.
Patented June 8, 1909.

Application filed February 15, 1909. Serial No. 478,059.

*To all whom it may concern:*

Be it known that I, JULIAN C. DOWELL, a citizen of the United States, residing at Washington, in the District of Columbia, have invented certain new and useful Improvements in Ball-Bearings; and I do hereby declare the following to be a full, clear, and exact description of the invention, such as will enable others skilled in the art to which it appertains to make and use the same.

This invention relates to roller bearings and more particularly to that class of bearings in which spherical rollers or balls are used to sustain or resist end thrust or pressure.

It is well known that when balls are used in annular series unconfined except by the opposing surfaces of the box or nuts and collars with which they contact they will inevitably crowd each other, and by reason of the contact of oppositely rotating surfaces thereof will produce much friction and unequal grinding and wear upon the bearing surfaces, thus impairing the efficiency and durability of the bearings. To avoid such difficulties various devices have heretofore been employed for separating and holding the balls in separated relation, so as to keep them apart when in use in the bearings and at the same time permit free rotation of the balls in all directions, and also adopt them to be removed in a body with the holder and separator without liability to drop out when the bearings are taken apart.

In order that the ball holding and separating cages of the class to which this invention relates may have sufficient strength and rigidity to do the work required of them, they have heretofore usually been constructed in separable parts having suitable openings through which the balls project in opposite directions, for contact with opposing bearing surfaces, such parts being secured together by bolts or otherwise after inserting or placing the balls in the spaces provided to receive them; but such constructions are expensive in manufacture and cause trouble and injury to the bearings, by coming apart or allowing the fastening bolts to drop out and clog the bearings. It has also been suggested that a ball holding and separating cage of the character referred to may be cut or swaged from a solid block of metal or spun from a metal tube; the balls being inserted by spreading apart the two plates or flanges between which the balls are placed, but it has been found that if such a device is made of the required thickness and quality of metal to adapt them for practical use the flanges will be broken off or bent out of shape or mutilated so as to render them unfit for use; and on the other hand, if the flanges are thin enough and far enough apart to permit the balls to be inserted between them without breakage or mutilation, the balls will not be effectually confined and held apart when in use in the bearings, but will get out of the spaces provided for them and as a result the cages will be ground up and crushed, with consequent breakage or injury to the bearings.

The object of my invention is to provide a ball bearing of the character referred to which shall possess all of the advantages without any of the objections which are incident to the use of such bearings as heretofore constructed; and to this end the invention consists in an improved end-thrust bearing constructed and adapted to operate substantially as hereinafter set forth.

Figure 2:
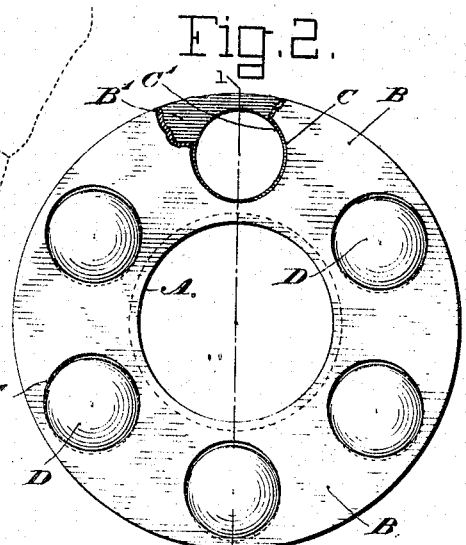
Figure 3:
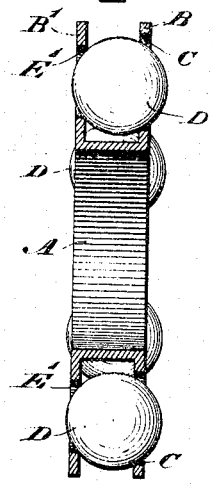

In the accompanying drawings, which are to be taken as a part of this specification, and in which the same reference letters are used to denote corresponding parts in different views, Figure 1 represents a vertical sectional elevation of a ball bearing embodying my invention; the section being taken on the line 1—1 of Fig. 2 and one of the balls being shown in the act of being forced through an opening of lesser diameter than the ball; Fig. 2 represents a side elevation of the bearing, a part thereof being broken away to show the openings of different sizes through which the balls project in opposite directions; Fig. 3 is a vertical sectional elevation of a similar ball bearing showing the series of openings in one side-plate or flange considerably smaller than the openings at the opposite side; and Fig. 4 is a diagrammatic representation of the method of inserting the balls.

Referring to said drawings, the letter A denotes a cylindrical body or ring having spaced flanges or plates B, B¹, which extend from said body in parallel planes, and are each formed or provided with a series of round openings C, C¹, which, as shown in Figs. 1 and 2, are approximately of the same size, or so nearly of the same size that the difference in diameter is hardly perceptible to the eye, in order that the balls may project to a comparatively great extent beyond the side walls or flanges, and have great freedom of movement, and still be effectually retained within the spaces provided for their reception. To this end the diameter of the balls is greater than the diameter of the openings in either side-plate or flange, though preferably the openings at one side are of larger diameter than the openings at the opposite side, yet smaller than the diameter of the walls, which are adapted to be inserted through the larger openings by virtue of the resiliency of the metal, when sufficient pressure is exerted to overcome the resistance due to the difference between the diameter of the opening and the diameter of the ball, and, when thus inserted the ball cannot escape. It is well known that steel is highly resilient, and it has been demonstrated by experiment that such metal will yield or may be compressed to a certain extent, whereupon it will freely recover itself, as a spring under pressure suddenly relaxed, thus permitting balls of a given size to be inserted through an opening of smaller size through which they cannot escape nor be removed except by pressure on the opposite side equal to the pressure exerted in forcing them into the opening.

Figure 4:
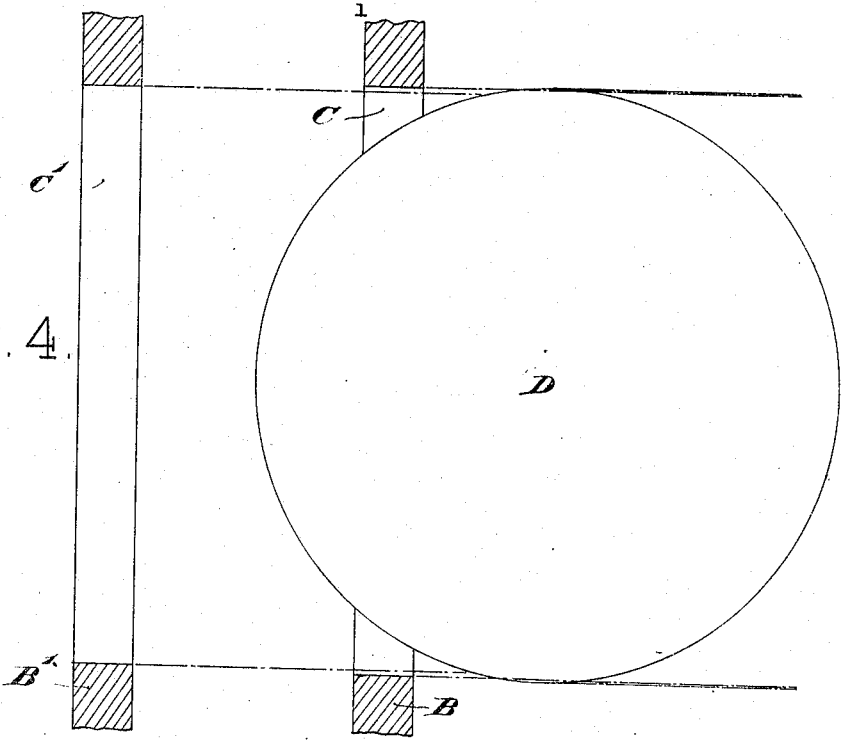

In the diagram Fig. 4 of the drawings, I have shown on an enlarged scale a sectional view of portions of the flanges B, B¹, partly broken away, and it will be seen that the ball, which is denoted by the circle, has a diameter slightly greater than the diameter of the opening C through which it is to be inserted and also greater than the diameter of the openings C¹ in the flange B¹. The difference in diameter, when the holder is made of hardened steel, may be such as to permit the insertion of the balls by pressure of the thumb, as shown in Fig. 1; the balls being "snapped" into place as between two spring-metal parts, the walls of the opening yielding sufficiently for this purpose, and then contracting so as to prevent the ball from escaping.

The construction shown in Fig. 3 of the drawings is substantially identical with that illustrated in Figs. 1 and 2, except that there is a greater difference between the sizes of the openings in the two flanges; the openings E¹ in flange B¹ being much smaller than the openings C in flange B, and the flanges are farther apart than those of the construction shown in Figs. 1 and 2, which construction permits less lateral play and freedom of movement of the balls, and permits them to project to a less extent beyond the side walls of the structure than is permitted by the construction shown in Figs. 1 and 2; otherwise the two constructions are the same, and the balls are inserted and retained in the same manner.

When constructed as described and shown the act of inserting and removing the balls may be performed by machine or hand pressure, in the case of hardened steel or metal possessing sufficient resiliency, though the power or force to be exerted will depend upon the difference between the size of the opening and the diameter of the ball to be inserted therethrough; and for greater certainty in insuring the retention of the balls within the holder and preventing them from escaping or being removed by any ordinary pressure, it may be desirable in some cases to subject the holder to a degree of heat sufficient to cause the metal to expand and enlarge the size of the openings and then insert the balls while the holes are thus enlarged, and when the metal cools and contracts it will be impossible to remove the balls by pressure or without breaking the holder.

Having thus described my invention, what I claim as new and desire to secure by Letters Patent of the United States is:—

1. A ball-bearing consisting of a circular body of resilient metal having rigid spaced flanges, the flanges having openings therein, and balls projecting in opposite directions through said openings, the diameter of the openings being less than the diameter of the balls which are forcibly inserted therethrough and prevented from escaping by virtue of the resiliency of the metal.

2. A ball-bearing consisting of a circular body of hardened steel having integral annular end-flanges with openings therein and balls between projecting in opposite directions through said openings, the diameter of the openings being less than the diameter of the balls which are forcibly inserted therethrough and prevented from escaping by virtue of the resiliency of the metal.

3. A ball-bearing consisting of a circular body having spaced annular flanges with openings therein and balls between projecting in opposite directions through said openings, the openings being normally smaller than the diameter of the balls which are forcibly inserted therethrough while enlarged by the application of heat.

In testimony whereof I affix my signature, in presence of two witnesses.

JULIAN C. DOWELL.

Witnesses:
JOSEPH C. STACK,
M. H. YATES.

It is hereby certified that in Letters Patent No. 924,440, granted June 8, 1909, upon the application of Julian C. Dowell, of Washington, District of Columbia, for an improvement in "Ball-Bearings," errors appear in the printed specification requiring correction, as follows: In line 32, page 1, the word "adopt" should read *adapt*, and in line 9, page 2, the word "walls" should read *balls;* and that the said Letters Patent should be read with these corrections therein that the same may conform to the record of the case in the Patent Office.

Signed and sealed this 29th day of June, A. D., 1909.

[SEAL.]
C. C. BILLINGS,
*Acting Commissioner of Patents.*